United States Patent [19]

Graham

[11] Patent Number: 5,207,180

[45] Date of Patent: May 4, 1993

[54] SQUIRREL PROOF SHAPED BIRD FEEDER WITH DUNG SHIELD

[76] Inventor: Shirly L. Graham, 9891 Baltimore National Pke., Ellicott City, Md. 21043

[21] Appl. No.: 661,223

[22] Filed: Feb. 27, 1991

[51] Int. Cl.$^5$ .............................................. A01K 39/014
[52] U.S. Cl. .................................. 119/52.3; 119/57.9; D30/124
[58] Field of Search .................... 119/52.2, 52.3, 57.8, 119/57.9; D30/124, 125, 127, 128, 131, 132, 133; 52/101

[56] References Cited

U.S. PATENT DOCUMENTS

| | | | |
|---|---|---|---|
| D. 83,358 | 2/1931 | Spankus | D30/125 |
| D. 193,558 | 9/1962 | Parry | D30/127 |
| 2,715,386 | 8/1955 | Jones | 119/52.2 |
| 2,866,435 | 12/1958 | Blazier | D30/128 X |
| 3,182,635 | 5/1965 | Waite | 119/57.8 |
| 3,648,661 | 3/1972 | Moore | 119/53 |
| 3,822,674 | 7/1974 | Tobin | D30/124 X |
| 4,896,628 | 1/1990 | Kadunce | 119/52.2 |
| 5,003,734 | 4/1991 | Dinsmore | 119/52.3 |

FOREIGN PATENT DOCUMENTS

| | | | |
|---|---|---|---|
| 0641770 | 7/1962 | Italy | 119/52.2 |
| 0499617 | 1/1939 | United Kingdom | 119/57.8 |

*Primary Examiner*—Gene Mancene
*Assistant Examiner*—Todd E. Manahan
*Attorney, Agent, or Firm*—L. A. Scholz

[57] ABSTRACT

An improved depending bird feeder container, having a dung shield suspended over the bird feeder container and having the container formed to a special shape, similar to a "bell" shaped substantially cylindrical walled housing or container of a specific minimum diameter at the top or suspended portion of the container and a flare of a minimum length. This shape defeats squirrels and similar animals from climbing down the outside of the feeder container.

4 Claims, 1 Drawing Sheet

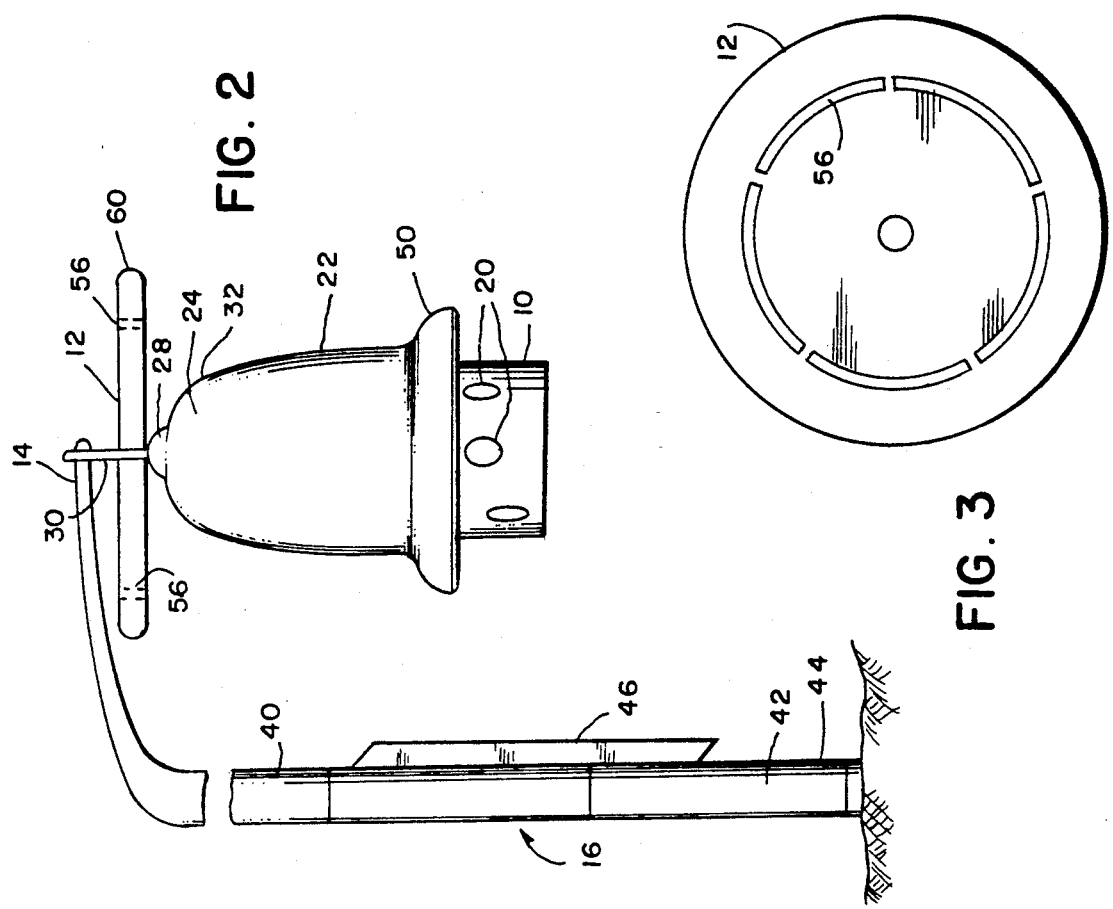
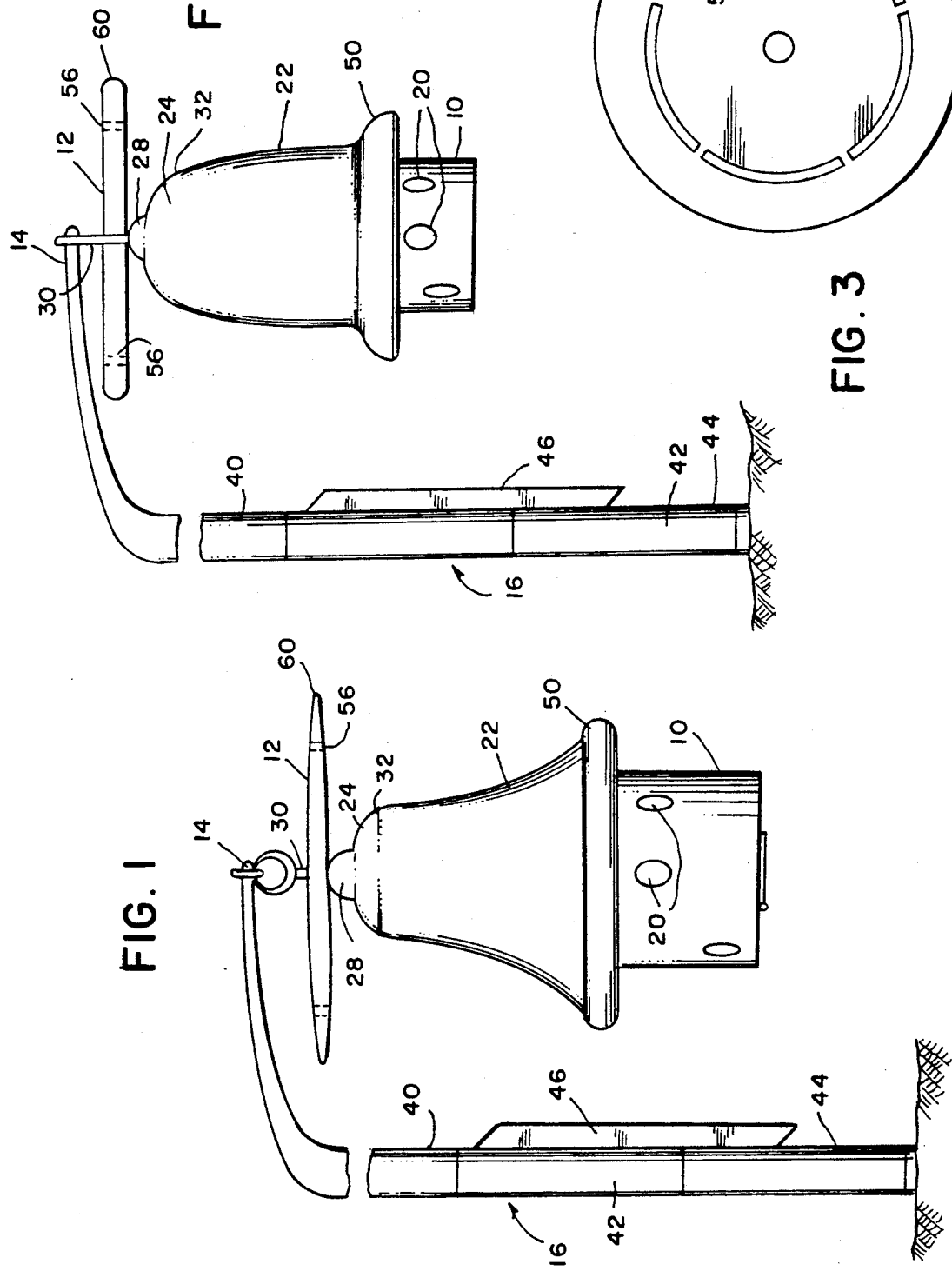

SQUIRREL PROOF SHAPED BIRD FEEDER WITH DUNG SHIELD

BACKGROUND OF THE INVENTION

1. Field of the Invention

The present invention relates to an improved bird feeder, and more particularly, however not limitatively, the present invention relates to a bird feeder suspended from a ground supporting pylon and having a dung shield disposed interposedly between the bird feeder and its connection to the supporting pylon.

2. Description of the Prior Art

Various prior art devices are known and bird feeding devices are customarily used to contain feed seeds and other food items to be made selectively available and accessible to birds in an attractive manner. Various hanging bird feeders with or without support systems have been found in the prior art U.S. patents and are cited below:

| | |
|---|---|
| Palfalvy | 4,019,462 |
| | 4,034,715 |
| Smith | 4,242,984 |
| Hinz | 4,570,575 |
| Graham | 4,974,547 |

None of these are of further interest to the present invention of a squirrel proof bird feeder 10 with a dung shield 12 supported by a pylon 16.

These known prior uses teach and disclose various types of bird feed devices of sorts and of various manufactures and the like, as well as methods of their construction, but none of them whether taken singly or in combination disclose the specific details of the combination of the subject invention in such a way as to bear upon the claims of the present invention.

SUMMARY OF THE INVENTION

An object of the invention is to provide a squirrel proof bird feeder by providing a container with a shaped bulbous roof 24 disposed above the bird feeder that prevents the squirrels and other rodents from climbing down an outside portion of the bell-shaped construction, but which allows birds to use their slender beaks to enter openings or feed presenters 20 in a lower more tapered portion of the feeder housing to get access at the feed.

Another object of the invention is to provide a novel and improved bird feeder, having an exterior shape to prevent the access to the bird feed by squirrels and other rodents.

Another object of the invention is to provide a novel and improved bird feeder having a dung shield interposed between the supporting pylon and the suspended bird feeder to prevent feces excreted by birds from messing the general external appearance of the bird feeder and which would provide a rough surface, effected by dried fecal matter, which would give squirrel and other rodents a footing at a top of the feeder, and thereby allow the squirrels to climb down sides of the container.

These together with other objects and advantages which will become subsequently apparent reside in the details of the process and operation thereof as more fully hereinafter is described and claimed, reference being had to the accompanying drawings forming a part hereof, wherein like numerals refer to like parts throughout.

DESCRIPTION OF THE SEVERAL VIEWS OF THE DRAWINGS

FIGS. 1 and 2 are elevation views of bird feeder shown suspended from the ground by a supporting pylon and embodying concepts according to a preferred embodiment and best mode of the present invention.

FIG. 3 is a plan view of the dung shield.

DESCRIPTION OF A PREFERRED EMBODIMENT OF THE INVENTION

Referring now to the drawings there is shown in FIGS. 1, 2 and 3 a squirrel or other rodent proof bird feeder 10 with a dung shield 12 arranged and interposedly disposed between a free end member 14 of a supporting pylon 16 and the depending feed container 22. The bird feeder 10 is made of a smooth and hard surfaced material defining a small cylindrical portion having openings or feed presenters 20 for receipt by the birds to feed and at the same time preventing squirrels or rodents from achieving access to the feed presenters 20.

The seed container 22 is generally bell-shaped and is positioned above the bird feeder 10 for providing gravity flow of seed from the seed container 22 into the bird feeder 10 and then through an opening in a bottom wall in the bird feeder, and which may have a selectively closeable filler opening (not shown) located therein for periodic filling the seed container 22.

An upper bulbous roof 24 of the bell-shaped construction of the seed container 22 has a knob member 28 for enabling a person or user of the bird feeder 10 to appropriately handle the filling and emptying of the bird feeder 10 and container 22. The knob member 28 has an opening at its center with an eyelet therein for receiving a strand or cable 30 there through for suspending the container 22 from the free end member 14 of the supporting pylon 16. The upper bulbous roof 24 is sized and so dimensioned about the shoulder 32, and extends downwardly from the shoulder 32, to a flare member of the bell-shaped construction of container 22, which does not allow the squirrel to jump the presenters 20 and hang on to knob 28 of the feeder.

The bird feeder 10 and the pylon 16 with its support system of cylindrical sleeves 40, 42, 44 with a rectangular plate 46 is attached tangential to the said sleeve cylinder 42 forming part of the pylon 16, so that the squirrel cannot spread its claws sufficiently to use the edges of the plate 46. The feeder 10 typically has the plurality of transverse horizontal openings or presenters 20 in a wall of the feeder 10 to receive feed for presentation to the birds so the birds may easily obtain the feed, which is accomplished while the bell-shaped housing of the container 22 prevents the squirrel or rodent from obtaining access to the feed.

The bell-shaped construction prevents squirrels and rodents from getting to this feed presenter 20 by forcing the animal to loose the grip on the roof 24 which is caused by spreading the animals feet sufficiently to cause it to loose its grip, and then a skirt 50 of the bell shape construction of the container 22 combined with gravity forces the animal to be propelled away from the feed area underneath and thus prevents the squirrel from reaching the feed presenters 20.

The seed container 22 may be constructed from TEFLON, LUCITE, glass, plastic and similar kinds of material.

Additionally the upper surface of the feeder 10 is kept clean and smooth and slippery by the use of the dung shield 12, which is in a form of an upside down "dinner plate", having circular slots 56 at the periphery of the plate of this dung shield 12 to provide a footing or twig member 60 for a perch for alighting birds. The bird feeder 10 with its support system 40, 42, 44 has the dung shield 12 to prevent the droppings from birds after they fly in and land from nearby perches. This is achieved by providing a perch of choice close to and over the feeder 19, but not on the feeder 10 itself, which would allow the approaching birds to alight at the top feeder location as their usual practice is. By alighting on the dung shield 12 either facing the center or away from the center, the birds are prevented from messing the top and sides of the feeder 10 and seed container 22 by directing the excrement either outside the dung shield 12 or on the dung shield 12 itself.

The dung shield 12 while being similar in appearance to a concavo-convex dish configuration, or to substantially hemispherical squirrel guards of the prior art that in the past have sometimes been hung over bird feeders 10 in a manner known in the art, is quite different in both structure and function from those similarly shaped items. The dung shield 12 may be made of or constructed of metal, ceramic, glass, plastic or other formable smooth semi-rigid weatherproof materials. It is shaped essentially as an upside down plane-convex disk shaped saucer or "dinner plate" having a circumference or periphery of a diameter substantially in excess of the size of the bird feeder 10 and its roof 24.

Also a series of arcuate slots 56 arranged circumferentially around the shield 12 and disposed slightly inwardly of the edge of the shield 12 but disposed slightly outwardly of the diameter of the feeder skirt 50 to provide adequate perch means to alighting potential for the bird, and is configured to provide a twig or perch structure for alighting, which constitutes an alternate set of positions, of choice, for the bird to face either inwardly or outwardly. If the bird faces outwardly, droppings tend to land on the dung shield, or pass or excrete through slots 56 of the shield 12 and miss the feeder 10; if the bird faces inwardly, droppings are excreted beyond the dung shield 12 as well as the feeder 10.

An underside of the dung shield 12 may have radial ribs to reinforce the shield for strength and keep the weight of the shield minimal, and preventing warpage when the shield is made of ceramics.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to falling within the scope of the invention.

I claim:

1. In an above the ground supported bird feeder system having a support and a bird feeder suspended therefrom, the improvement comprising;
the bird feeder having an upper, generally bell shaped portion and a lower feeding portion; said upper portion having a knobbed roof with a slightly enlarged roof shoulder thereunder and a wall portion extending downwardly from the roof shoulder and terminating in an outwardly projecting flared section; said lower feeding portion extending beneath the flared section and having a diameter substantially smaller than that of said flared section, said lower feeding portion further having feed presenting means therein for allowing birds access to the feed contained in the feeder; and a dung shield disposed above the feeder between a free arm of the support and the knobbed roof of said feeder, the dung shield having a plurality of arcuate slots therein, said slots being positioned about the periphery of said dung shield such that the innermost edge of each slot is located outwardly beyond the flared section of said feeder.

2. A device as in claim 1 wherein said lower feeding portion additionally has a bottom wall portion having a filler opening, and said opening has a selectively closeable means located therein for filling said feed container.

3. A device as in claim 1 wherein
said knobbed roof is integral with said roof shoulder and of a size to conveniently fit the hand of the operator when holding the feed container inverted to be filled or refilled.

4. A ground supported bird feed system consisting of a feeder, suspended from a vertical feeder support
a circularly slotted dung shield supported intermediate said support and said feeder, and
said feeder means constructed having its greatest diameter substantially smaller than the smallest diameter of the innermost edge of the dung shield.

* * * * *